Oct. 2, 1962 E. D. MARR 3,056,521
MATERIAL UNLOADING AND CONVEYING APPARATUS FOR TRUCKS
Filed June 20, 1960 2 Sheets-Sheet 2
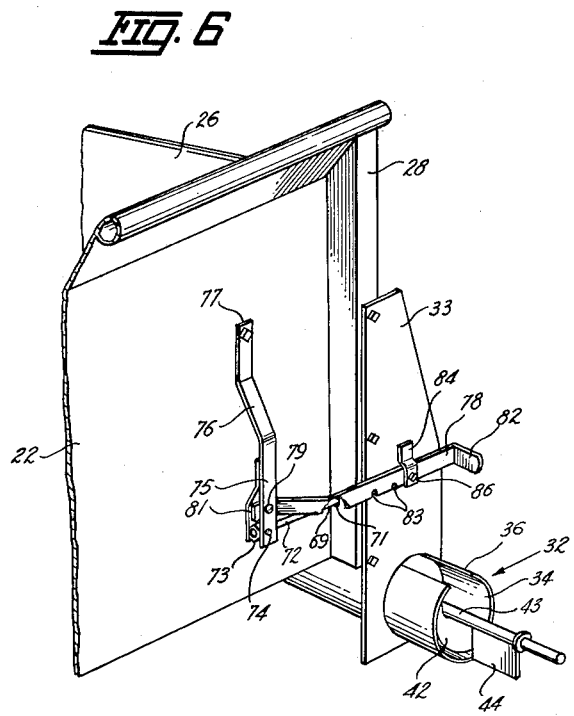
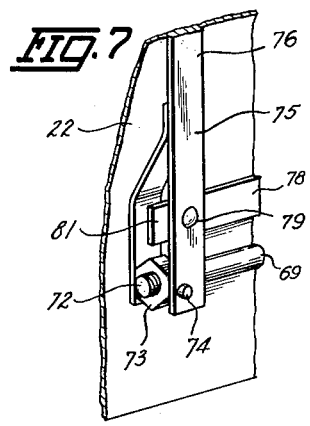
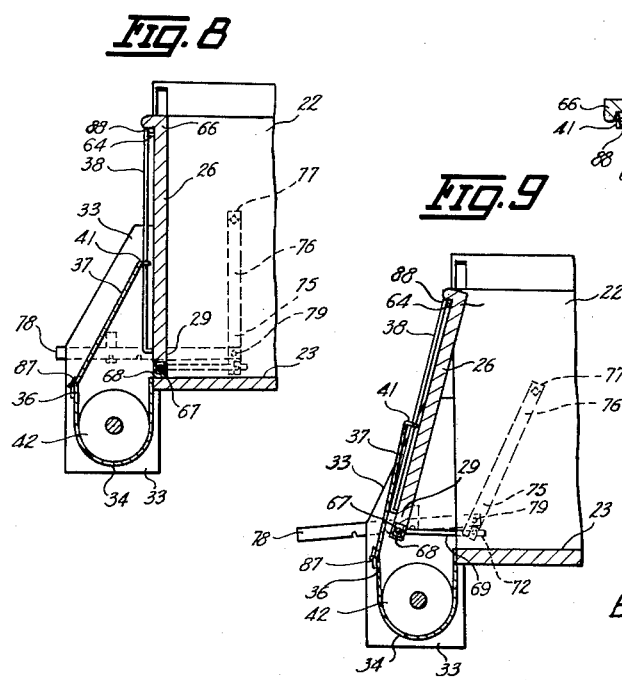
INVENTOR.
ELMER D. MARR
BY Lowell & Henderson
ATTORNEYS.

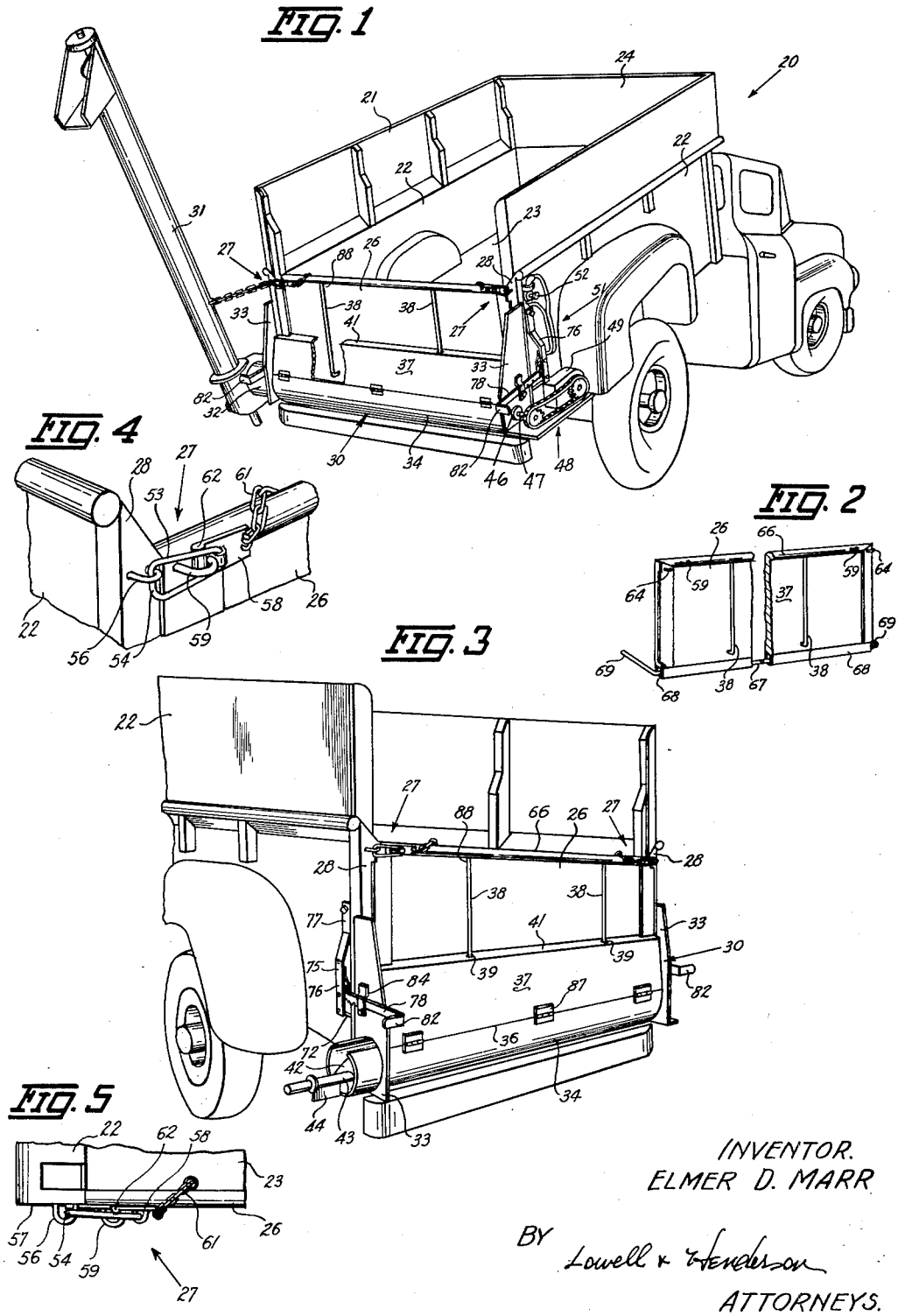

3,056,521
MATERIAL UNLOADING AND CONVEYING APPARATUS FOR TRUCKS
Elmer D. Marr, Box 177, Corwith, Iowa
Filed June 20, 1960, Ser. No. 37,222
2 Claims. (Cl. 214—508)

This invention relates to a material unloading and conveying mechanism for trucks and the like and concerns itself primarily with a conveyor supported across the rear end of a truck and combined with an adjustably swingable end gate for the truck, for both directing material within the truck body into the conveyor and for controlling the rate of flow of material into the conveyor.

It is an object of this invention to adapt the rear end of a conventional, hydraulically tilted truck body with a conveying mechanism for the purpose of transversely conveying material discharged from the body to the side thereof for unloading purposes, while retaining the full normal use of the truck body.

Another object of this invention is to provide a novel structure attachable to a conventional tiltable truck body for transversely conveying and unloading material gravitationally discharged from the truck body.

A further object of this invention is to provide a truck body having a conveying means attachable to the rear of the truck body in which a tail gate is swingable rearwardly from the top thereof to direct material to be discharged into the conveying means.

Yet another object of this invention is to provide apparatus for attaining the above mentioned objectives which is simple but rugged, easy to install, and effective in service.

These objects, and other features and advantages of this invention will become readily apparent upon reference to the following description when taken in conjunction with the accompanying drawings, wherein:

FIG. 1 is a perspective view of a material hauling truck embodying a conveyor mechanism involving this invention, with certain parts broken away for illustrative purposes;

FIG. 2 is a fragmentary foreshortened, detail perspective view of the tail gate and associated parts of this invention;

FIG. 3 is a perspective view of the rear of the truck body of FIG. 1, and with the elevator assembly of the conveyor mechanism removed;

FIG. 4 is a fragmentary, enlarged perspective view of one of the upper latch units for the tail gate;

FIG. 5 is a fragmentary, enlarged plan view of the latch unit of FIG. 4;

FIG. 6 is a fragmentary perspective view of one rear corner of the truck body;

FIG. 7 is a fragmentary, enlarged perspective view of a detail of FIG. 6; and

FIGS. 8–10, inclusive, are vertical sectional views of the rear of the truck body, and showing in particular the normally vertical, the rearwardly swung, and the normally horizontal positions of the tail gate.

Referring now to the drawings, a material hauling vehicle is indicated generally at 20 in FIG. 1 and has a truck body 21 of a conventional type which is tiltable for discharging material rearwardly therefrom by gravity. The body 21 includes side walls 22, a bottom or floor 23, a front end wall 24, and a tail gate 26.

The tail gate 26 is adapted to assume a vertical position (see FIG. 8) relative to the side walls 22 and the floor 23 for holding material being hauled within the body 21; and by means of latch units 27 pivotally interconnecting the upper corners of the tail gate 26 with the usual posts 28 at the rear of the body 21, the lower end of the tail gate is swingable rearwardly (see FIG. 9) from the body 21. Additionally, as will be described in detail hereinafter, the upper end of the tail gate can be pivoted relative to its lower end 29 to assume a position substantially horizontal with the truck floor 23.

For the purpose of conveying material gravitationally discharged from the truck body 21 to the side thereof for unloading, a transversely extended conveyor assembly 30 (FIGS. 1 and 3) is provided for attachment to the rear of the body 21, and which can be optionally combined with a conventional elevator conveyor unit 31 connected to the output end 32 of the conveyor assembly 30 (hereinafter referred to for convenience as the "conveyor").

The conveyor 30 comprises a pair of end plates 33 (FIGS. 1 and 3) each of which is secured in an upstanding manner to the outer side of an end post 28, and extended rearwardly for supporting an elongated, semicylindrical housing 34 rearwardly of and below the level of the floor 23 (FIG. 8). Hinged to the upper outer edge 36 of the housing 34 is a cover 37 which extends transversely across the lower rear portion of the tail gate 26 between the end plates 33, and which is normally inclined upwardly toward the tail gate 26 (see FIG. 8). The cover 37, is also utilized as an extension of the tail gate 26 for directing material from the truck body 21 into the housing 34, is movably supported on a pair of vertically disposed rods 38 (FIG. 2) secured at their upper and lower ends to the tail gate 26 and spaced outwardly therefrom. The rods 38 are received in openings 39 (FIG. 3) formed in an upper inturned flange 41 of the cover 37, whereby upon swinging movement of the tail gate 26, as described hereinafter, the cover 37 moves on its hinges 87 relatively to the tail gate 26.

An auger 42 (FIG. 8) of the type commonly employed to convey materials in loose form is mounted to be rotatably carried longitudinally of the housing 34. The outer end 43 (FIG. 6) of the auger 42, on which is shown a paddle 44 for directing material into the elevator unit 31, extends to the output end 32 of the housing 34, which end 32 extends through an opening provided therefor in the corresponding end plate 33. At the other end of the housing 34, a bearing 46 (FIG. 1) is mounted in the corresponding end plate 33 for rotatably supporting a stub shaft extension 47 of the auger 42. Power for rotating the auger 42 is supplied via the extension 47 by a drive sprocket and chain unit 48 driven off a fluid driven motor 49 (utilizing fluid from the vehicle power unit). A conventional bypass system, indicated generally at 51 in FIG. 1, includes a bypass valve 52 for regulating the output drive of the motor 49, and thus regulating the speed of operation of the auger 42.

The latch units 27, adapted when locked to permit a rearward swinging movement of the bottom 29 of the tail gate 26, each includes a hasp 53 (FIGS. 4 and 5) pivotally connected in a loose manner at one end 54 to a U-shaped projection 56 secured to the rear face 57 of a corresponding end post 28. The hasp 53 is pivotally connected at the other end to a link 58, and is adapted to close over a hook 59 secured to the tail gate 26. The link 58 is connected to a chain 61 at one end, and upon the other end 62 being inserted behind the hook 59 to act as a fulcrum against the tail gate 26, is movable past a dead center to lock with the hasp 53. The structure of each latch unit 27 will pivot or twist sufficiently to enable the tail gate 26 to swing rearwardly on and about the projections 56. However, various other types of latch units can be utilized for this same purpose, as for example a conventional latch of the sliding bolt type. The other end 63 of the chain 61, when in use, is adapted to hold the tail gate 26 in a horizontally disposed position (FIG. 10) by attaching to a hook 64 provided therefor.

To provide for a pivotal movement of the tail gate 26 about its bottom 29, the latch unit being unlatched so that the upper edge 66 of the tail gate is free, an elongated, U-shaped pivot rod 67 (FIG. 2) is provided for transverse extension through an open channel 68 formed at the tail gate bottom 29. The bent ends 69 of the pivot rod 67 each extend forwardly through openings 71 (FIG. 6) provided therefor in each of the end posts 28, and each end 69 has a threaded portion 72 adapted for initial threaded adjustment to a nut 73 (FIGS. 6 and 7).

Each nut 73, as best illustrated in FIG. 7, includes laterally extended pins 74, only one showing, for pivotal connection in the lower yoke-like portion 75 of an arm 76 (FIG. 6) pivotally connected at its upper end 77 to the corresponding side wall 22. For pivotally moving arms 76, whereby the pivot rod ends 69 and thus the rod 67 and tail gate bottom 29 are correspondingly moved, a pair of irregularly shaped straps 78 (FIG. 3) are provided. Each strap 78 (FIGS. 6 and 7) is pivotally connected by a pin 79 at its inner end 81 within the yoke-like arm portion 75, is bent to accommodate movement relative to an adjacent end post 28, and includes a handle portion 82 at its outer end for manual manipulation.

Additionally, for adjustably locking the straps 78, thus providing a variable positioning of the tail gate bottom 29, each strap is provided with a plurality of notches 83 (FIG. 6) formed along the lower edge thereof. A U-shaped support 84 (FIG. 3), attached to each end plate 33 and through which a corresponding strap 78 extends, is provided with a lower stud 86 which is exposed between the support 84 and the end plate 33 for engagement in any one of the notches 83.

In use the conveyor assembly 30 is adapted to permit normal use of the truck body 21 and the tail gate 26. Thus, with the latches 27 locked and with the pivot rod 67 locked at its inner or forward-most position, the tail gate 26 (FIG. 8) is maintained in a normal vertical position. Should it be desired to let the tail gate down to assume a normal horizontal position (FIG. 10) the latches 27 are merely released, the tail gate pivoted about the rod 67 and held level with the truck body floor 23 by the chains 61. During the counterclockwise pivotal movement of the tail gate 26 from its upstanding position of FIG. 8 to its horizontal position of FIG. 10, the cover 37 also pivots counterclockwise about its hinges 87, with the upper flange 41 riding upwardly along the tail gate rods 38. As best seen in FIG. 10, when the tail gate is down the cover flange 41 has moved from an initial position intermediate the rods 38 (FIG. 8) to a position adjacent their uppermost ends 88.

When the truck 20 is hauling loose material and it is desired to discharge the material to the side thereof, either at the conveyor output end 32 (FIG. 6) or through the swingable elevator unit 31 (FIG. 1), the strap handles 82 are first lifted to clear the notches 83 of the studs 86. Then the straps 78 are pulled rearwardly away from the truck body 21, pivoting the arms 76 also rearwardly. This movement is transmitted from the arms 76 to the pivot rod 67 to pull or swing out the bottom 29 of the tail gate 26, the upper edge 66 of which pivots about the locked latch units 27. When the tail gate 26 (FIG. 9) is locked at the desired inclination, the motor 29 is turned on to rotate the auger 42, and upon the truck body 21 being tilted upwardly (FIG. 1) it can readily be seen that as the material gravitationally moves rearwardly along the truck body floor 23, it falls into the auger housing 34 and is moved by the auger 42 toward the output end 32 thereof for unloading.

It should be noted that during the use of the conveyor assembly 30, the cover 37 acts as a lower extension of the tail gate 26 to not only deflect material into the housing 34, but also to prevent the material from spilling out below the tail gate bottom.

In summation, a transverse conveyor assembly 30 for the rear end of a tiltable truck body 21 is disclosed for use with a tail gate 26 provided at its upper outer corners with latch units 27 which function alternately as locking and pivoting means for the tail gate 26, or as unlocking means therefor. Additionally, the bottom of the tail gate 26 is combined with an adjustable pivot in the form of the pivot rod 67 and associated parts for adjusting the inclination of the tail gate relative to the conveyor assembly 30 to regulate the flow of material from the truck body 21 into the conveyor assembly 30.

I claim:

1. In a material handling vehicle having a tiltable body with a bottom wall and an open rear end, an unloading conveyor extended transversely of the rear of the body below the level of said bottom wall, a tail gate for closing said open end, means pivotally supporting the tail gate at its upper end on said body for movement of the lower end between a body closing position and a body opening position, a flat plate means coextensive in length with said tail gate inclined upwardly and forwardly from the rear side of said conveyor when the tail gate is in a body closing position with the upper edge thereof adjacent to the rear side of and spaced upwardly from the lower end of the tail gate, to constitute a cover for said conveyor, means movably connecting the lower side of said plate means to the rear side of said conveyor, and other means connecting the upper side of said plate means to said tail gate for movement relative thereto, said plate means, in response to the movement of said tail gate to a body opening position, being movable out of a covering relation with said conveyor into a side by side relation with the tail gate to form a downward extension for said tail gate, whereby to direct material from the open end of said body into said conveyor.

2. In a material handling vehicle having a tiltable body with a bottom wall and an open rear end, an unloading conveyor extended transversely of the rear of the body below the level of said bottom wall, a tail gate for closing said open end, means releasably pivotally connecting the upper end of the tail gate on said body for movement of the tail gate from an upright body closing position to a downwardly and rearwardly inclined body opening position, pivot means for the lower end of said tail gate adjustably mounted on said body for movement from a first position adjacent said body to a second position rearwardly from said body, said tail gate, when the pivot means is in said first position and said pivotal connecting means is released, being movable into substantially the plane of said bottom wall to form a rearward extension thereof, a plate means coextensive in length with said tail gate inclined upwardly and forwardly from the rear side of said conveyor, when the tail gate is in a body closing position, to form a cover for said conveyor, means pivotally connecting the lower end of said plate means with said conveyor, means movably connecting the upper end of said plate means with said tail gate for movement transversely of the tail gate, said plate means, in response to movement of the tail gate to a body opening position, being movable to form a downward extension for said tail gate whereby to cooperate with the tail gate in directing material from said open end into said conveyor, and said plate means in response to the movement of the tail gate to form an extension for said bottom wall, being extended rearwardly from the rear side of said conveyor and below said tail gate.

References Cited in the file of this patent
UNITED STATES PATENTS

| | | |
|---|---|---|
| 2,142,690 | Goserud | Jan. 3, 1939 |
| 2,344,755 | Venard | Mar. 21, 1944 |
| 2,834,493 | Romberg | May 13, 1958 |
| 2,837,228 | Kaster | June 3, 1958 |